United States Patent
Yuan et al.

(10) Patent No.: US 7,305,317 B2
(45) Date of Patent: Dec. 4, 2007

(54) JOINT APPROACH OF OUT-OF-RANGE DETECTION AND FAULT DETECTION FOR POWER PLANT MONITORING

(75) Inventors: Chao Yuan, Plainsboro, NJ (US); Zehra Cataltepe, Fair Haven, NJ (US); Claus Neubauer, Monmouth Junction, NJ (US); Ming Fang, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 523 days.

(21) Appl. No.: 10/932,573

(22) Filed: Sep. 2, 2004

(65) Prior Publication Data
US 2005/0055609 A1 Mar. 10, 2005

Related U.S. Application Data

(60) Provisional application No. 60/500,778, filed on Sep. 5, 2003.

(51) Int. Cl.
*G01C 25/00* (2006.01)
(52) U.S. Cl. .................... 702/116; 702/185
(58) Field of Classification Search ............... 702/116, 702/185
See application file for complete search history.

(56) References Cited

U.S. PATENT DOCUMENTS 5,544,320 A    8/1996   Konrad
6,175,934 B1   1/2001   Hershey et al.
6,343,251 B1   1/2002   Herron et al.
6,438,484 B1   8/2002   Andrew et al.
6,499,114 B1   12/2002  Almstead et al.
6,556,956 B1   4/2003   Hunt
6,898,554 B2 * 5/2005   Jaw et al. ................... 702/185
2003/0018394 A1 1/2003  McCarthy et al.

FOREIGN PATENT DOCUMENTS

EP    1006446   7/2000

* cited by examiner

*Primary Examiner*—John Barlow
*Assistant Examiner*—Stephen J. Cherry
(74) *Attorney, Agent, or Firm*—Donald B. Paschburg; F. Chau & Associates, LLC

(57) ABSTRACT

A joint approach of out-of-range detection and fault detection for power plant monitoring. The method initially determines whether a sensor is an independent sensor or a dependent sensor. If the sensor is an independent sensor, then an operating range is established for each independent sensor. A reading from each independent sensor is then compared with the operating range that has been established. If the reading is out-of-range, an alarm may be activated. If the reading is not out-of-range, then this reading is used to determine an expected operating range for each dependent sensor. A reading from each dependent sensor is then compared with the predicted operating range. Again, if the reading from the dependent sensor is out of the expected range, an alarm may be sounded.

19 Claims, 2 Drawing Sheets

JOINT APPROACH OF OUT-OF-RANGE DETECTION AND FAULT DETECTION FOR POWER PLANT MONITORING

This application claims priority to Provisional Application No. 60/500,778, filed on Sep. 5, 2003, entitled, "JOINT APPROACH OF OUT-OF-RANGE DETECTION AND FAULT DETECTION FOR POWER PLANT MONITORING."

FIELD OF THE INVENTION

This invention is directed generally to power plant systems, and more particularly to monitoring power plant systems.

BACKGROUND

The task of a power plant monitoring system is to detect faults and avoid damages to the power plant that might be caused by these faults. This is typically achieved by monitoring the sensor vector. Each sensor vector generally includes a set of sensors that reflect the performance of the power plant. When the power plant works normally, the sensor vector should be located inside a normal operating region. When the sensor vector deviates much from this region, a fault might occur and an alarm may be activated. Most prior art monitoring systems address how to train a statistical model based on a set of sensors, but few attempted differentiating the types of sensors based on their correlation.

Accordingly, what is needed is a method of monitoring a power plant by differentiating between different types of sensors. What is also needed is a method of monitoring a power plant by monitoring those sensors that are out-of-range. What is also needed is a method of monitoring a power plant using expected values for those sensors that it is possible to predict the operating values for other sensors and detecting faults in those sensors.

SUMMARY OF THE INVENTION

This present invention provides a method of detecting fault in a sensor that initially determines whether a sensor is an independent sensor or a dependent sensor. If the sensor is an independent sensor, then an operating range is established for each independent sensor. A reading from each independent sensor is then compared with the operating range, and an alarm may be sounded if the reading from the independent sensor is out-of-range. Next, the reading from each independent sensor is used to determine an expected operating range for each dependent sensor. A reading from each dependent sensor is then compared with the predicted operating range, and an alarm may be sounded if the reading from the dependent sensor is out of the expected range for the dependent sensor.

These and other embodiments are described in more detail below.

DETAILED DESCRIPTION OF THE INVENTION

Figure 1:
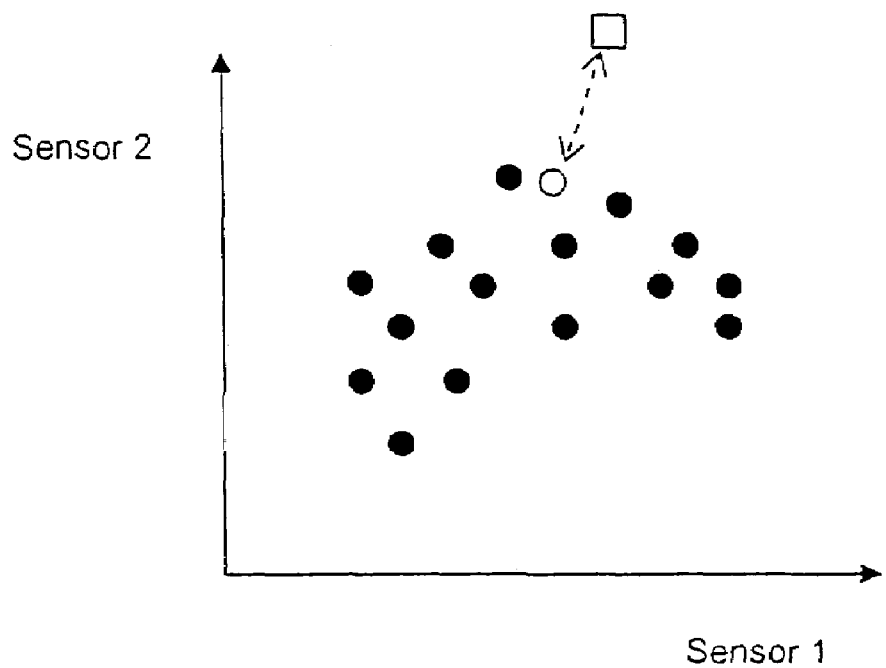
FIG. 1 shows the distribution of the operating region when the sensors are independent.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method of monitoring power plant systems. The method utilizes a joint approach to power plant monitoring by distinguishing between different types of sensors that are used in monitoring power plant systems. In general, prior art systems failed to distinguish between different types of sensors, hereby creating inaccuracies in the monitoring.

In a power plant, the plant may be monitored using a plurality of sensors and a control center or system that monitors these sensors. When a power plant is to be monitored, the plant is operated for an initial period of time in which sensor readings are taken for each of the sensors. These sensor readings are recorded and this initial data is used as the training data to establish the operating ranges for each sensor. As there may be multiple operation modules for a power plant in which the plant operates normally, each sensor may have a range of operating values in which the sensor may be operating "normally." As there may be a range of values, it would be beneficial to note those instances when a sensor-is operating out of this range as this may either indicate a faulty sensor or, alternatively, that the power plant is not operating normally.

In addition, there may be instances when a sensor is operating within its expected range, but wherein the sensor is still faulty or the power plant is not operating normally. These instances are especially troublesome as there is no initial warning that a sensor is out-of-range. This situation may occur in an instance wherein the sensor should, based upon the operating model for the plant at that time, show a reading at one end of the spectrum, but rather is showing a reading at the opposite end of the range. The present invention, by distinguishing between different types of sensors, is capable of predicting an expected range for certain sensors and, therefore, detecting those instances wherein the sensor may show a reading within a given range, but still outside of an expected range, thereby showing sensor fault or a problem with the power plant.

The methods of the present invention are designed based on the determination that the sensors used in power plant monitoring may separated into two categories: independent and dependent sensors. A "dependent sensor" is any sensor whose data relies on the values of one or more independent sensors. An "independent sensor" is any sensor have small correlation between that independent sensor and another independent sensor. For example, the gas flow, inlet guide vane (IGV) and inlet temperature sensors would generally be designated as independent sensors, since each of these sensors may vary without being affected by the other two sensors. On the other hand, the power sensor or a blade path temperature sensor would be a dependent sensor as its value may be predicted from a set of independent sensors.

The present invention separates the sensors into independent sensors and dependent sensors using a determinator. The determinator may make a determination using a variety of ways. In one embodiment, the determination of independent and dependent sensors may be done by an individual that possesses domain knowledge of power plant monitoring. Alternatively, in another embodiment, the determination of independent and dependent sensors may be performed using statistical analysis of data collected by the sensor.

Once a determination has been made regarding which sensors are independent sensors and which are dependent sensors, then the method of the present invention is better able to monitor the power plant. If the sensor is an independent sensor, then a determination is made whether the sensor is operating within range or out-of-range. FIG. 1 shows the distribution of the operating region when the sensors are independent. For illustration purposes, only two sensors are shown.

In the present invention, the anomaly detection problem for an independent sensor is referred to as an out-of-range detection, where "out-of-range" is defined as a situation wherein an independent sensor's values vary beyond the range of the values observed for that sensor during training. This is a one class classification problem as shown in FIG. 1; During training, the distribution of the operating region is learned. During monitoring, the residue from a test input (open rectangle in FIG. 1 ) to its projection (open circle in FIG. 1) onto the boundary of the operating region is computed. If the residue is larger than a threshold, an out-of-range alarm may be made. If an out-of-range problem is detected, the operator may then be requested to select more training data that captures the new range of operation. In an alternative embodiment, additional processing the data may be stopped as it may not be known whether a fault alarm is due to the out-of-range problem or a real fault.

If the independent sensor is within range, then the present invention uses the independent sensor to help predict a value for each dependent sensor that is dependent on the independent sensor. Again, as the independent sensor may have a range of operation, the prediction for the dependent sensors may also be a range of operating value based upon the reading from the independent sensor. The method then takes a reading from the dependent sensor.

Figure 2:
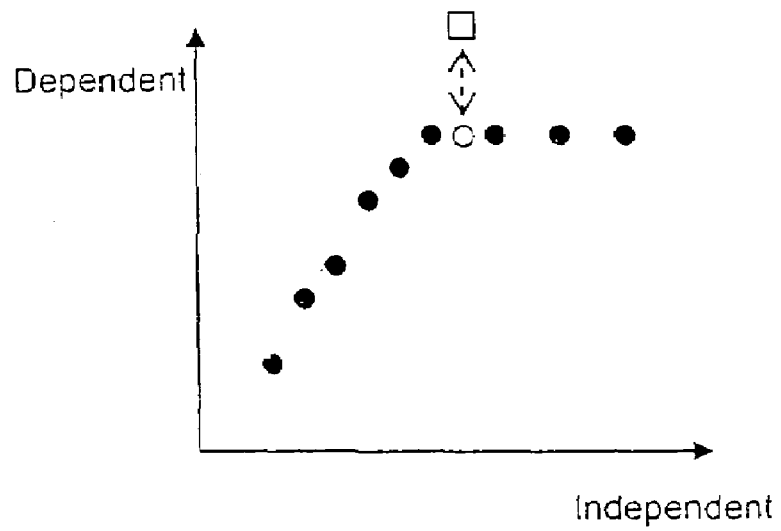
FIG. 2 shows an example of sensor dependence, where the sensor vector includes a dependent sensor and an independent sensor.

As for dependent sensors, the present invention refers to the anomaly detection problem for dependent sensors as "fault detection." FIG. 2 shows an example of sensor dependence, where the sensor vector includes a dependent sensor and an independent sensor. Again, for illustration purposes, only two sensors are shown. Since any dependent sensor value relies on one or more independent sensor values, each dependent sensor value is predictable from an independent sensor value as shown in FIG. 2. This is different from FIG. 1, where, given a value for sensor one, there may be multiple values for sensor two (since they are independent). The fault detection problem presented in FIG. 2 may be viewed as a regression problem; the dependent sensor value is predicted from the independent sensor value. If the difference between the prediction (open circle) and the real dependent sensor value (open rectangle) is larger than a threshold, a fault alarm may be made.

Figure 3:
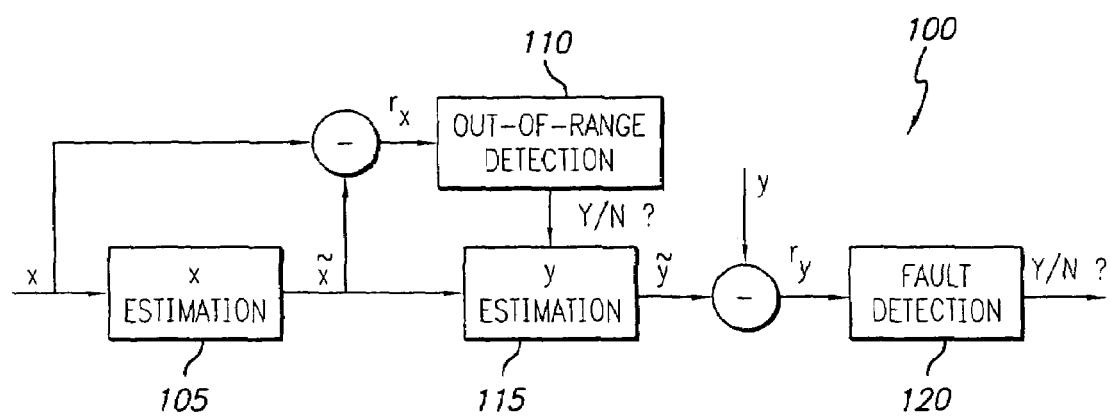
FIG. 3 shows a flow chart for a method of monitoring sensors according to one embodiment of the present invention.

The present invention also provides a system that, in one embodiment, is capable of handling out-of-range and fault detection simultaneously. Let x, y denote the independent and dependent sensors, respectively. Let $\tilde{x}$ and $\tilde{y}$ denote the estimates of x and y. For this embodiment, $r_x$ and $r_y$ may be used to indicate the residue of x and y, respectively. FIG. 3 shows the block diagram of one embodiment of a method of the present invention.

As shown in FIG. 3, one embodiment of the present invention includes a system 100 that includes the following steps—First, in step 105, $\tilde{x}$ is estimated from original independent sensor data x. Then, in step 110, the residue $r_x$ between $\tilde{x}$ and x is computed. If the residue is larger than a threshold, the method may be stopped, an out-of-range problem may be reported and the operator may be asked to use more training data that captures these independent sensor variations. Otherwise, if $r_x$ is smaller than that threshold, then $\tilde{x}$ is used to estimate or predict $\tilde{y}$ in step 115. Then, the residue $r_y$ between $\tilde{y}$ and y may be computed in step 120 and check if a fault occurs.

Accordingly, the methods of the present invention may be used to monitor power plant systems by differentiating between different types of sensors. An out-of-range analysis is performed for each independent sensor while a fault detection analysis is performed for each dependent sensor. An alarm may be sounded for an out-of-range problem, a fault detection, or both. The methods of the present invention are better able to monitor power plant systems due to the differentiation between different sensors used in the monitoring system.

Additionally, while the present disclosure has been directed to power plant monitoring, it is to be understood that the present invention may be utilized in any system wherein it would be beneficial to monitor a plurality of sensors at the same time.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of monitoring sensors comprising:
   determining whether the sensor is an independent sensor or a dependent sensor;
   establishing a first selected operating range for each independent sensor;
   comparing a reading from the sensor with the first selected operating range if the sensor is an independent sensor;

using a reading from each independent sensor to determine a second selected operating range for each dependent sensor if the reading from the independent sensor is within the first selected operating range; and comparing a reading from the sensor with the second selected operating range if the sensor is a dependent sensor.

2. The method of claim 1, wherein the sensor is used in a power plant monitoring system.

3. The method of claim 1, wherein the determination of whether the sensor is an independent sensor or a dependent sensor is made by an individual.

4. The method of claim 1, wherein the determination of whether the sensor is an independent sensor or a dependent sensor is made by using a statistical analysis of data collected by the sensor.

5. The method of claim 1, wherein a statistical model is used to compare the reading from the sensor with the first selected operating range if the sensor is an independent sensor.

6. The method of claim 1, wherein a statistical model is used to compare the reading from the sensor with the second selected operating range if the sensor is a dependent sensor.

7. The method of claim 1, further comprising indicating an alarm if the reading from the independent sensor is outside the first selected operating range; indicating an alarm if the reading from the dependent sensor is outside the second selected operating range; or both.

8. A computer readable medium embodying instructions executable by a processor to perform a method for monitoring sensors, the method steps comprising:
    determining whether the sensor is an independent sensor or a dependent sensor;
    establishing a first selected operating range for each independent sensor;
    comparing a reading from the sensor with the first selected operating range if the sensor is an independent sensor;
    using a reading from each independent sensor to determine a second selected operating range for each dependent sensor if the reading from the independent sensor is within the first selected operating range; and
    comparing a reading from the sensor with the second selected operating range if the sensor is a dependent sensor.

9. The machine-readable storage of claim 8, wherein the sensor is used in a power plant monitoring system.

10. The machine-readable storage of claim 8, wherein the determination of whether the sensor is an independent sensor or a dependent sensor is made by using a statistical analysis of data collected by the sensor.

11. The machine-readable storage of claim 8, wherein a statistical model is used to compare the reading from the sensor with the first selected operating range if the sensor is an independent sensor.

12. The machine-readable storage of claim 8, wherein a statistical model is used to compare the reading from the sensor with the second selected operating range if the sensor is a dependent sensor.

13. The machine-readable storage of claim 8, wherein the machine-readable storage is able to perform the step of indicating an alarm if the reading from the independent sensor is outside the first selected operating range; indicating an alarm if the reading from the dependent sensor is outside the second selected operating range; or both.

14. A system for detecting fault in a sensor comprising:
    a determinator for determining whether the sensor is an independent sensor or a dependent sensor;
    a first system for determining a first selected operating range;
    a first mechanism for comparing a reading from the sensor with the first selected operating range if the sensor is an independent sensor;
    a second system for determining a second selected operating range for each dependent sensor if the reading from the independent sensor is within the first selected operating range;
    a second mechanism for comparing a reading from the sensor with the second selected operating range if the sensor is a dependent sensor.

15. The system of claim 14, wherein the sensor is used in a power plant monitoring system.

16. The system of claim 14, wherein the determinator is a statistical analysis of data collected by the sensor.

17. The system of claim 14, wherein the first mechanism is a statistical model.

18. The system of claim 14, wherein the second mechanism is a statistical model.

19. The system of claim 14, further comprising an alarm.

* * * * *